Patented Nov. 24, 1942

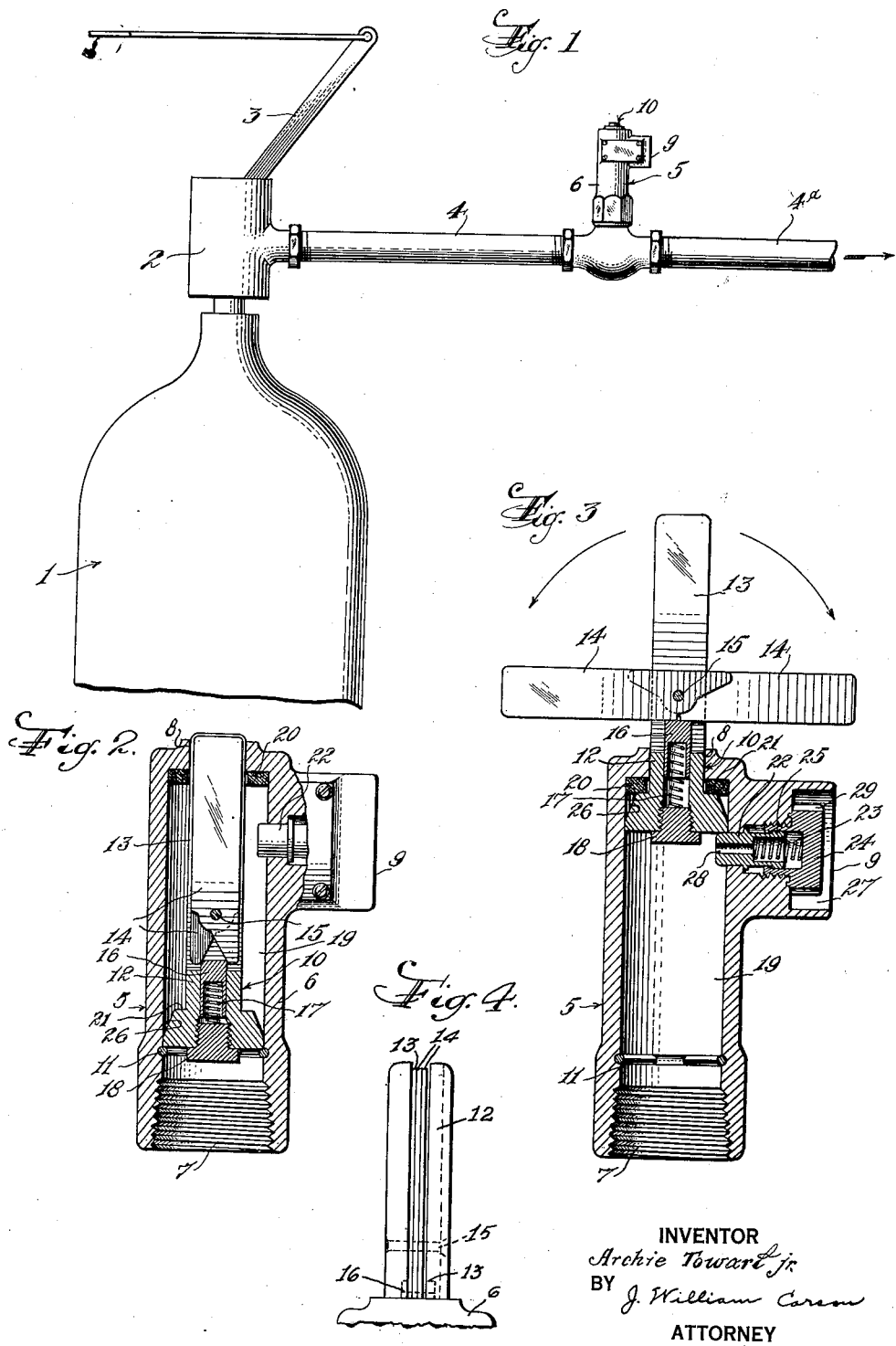

2,302,724

UNITED STATES PATENT OFFICE 2,302,724

INDICATING FLUID MEDIUM DISTRIBUTING SYSTEM

Archie Towart, Jr., Caldwell, N. J., assignor to Specialties Development Corporation, Bloomfield, N. J., a corporation of New Jersey Application December 30, 1939, Serial No. 311,744

10 Claims. (Cl. 116—112)

This invention relates to fluid medium distributing systems, and more particularly to apparatus used in connection therewith to indicate the presence of fluid pressure in the system.

Fluid medium distributing systems, especially of the type encountered with in fire extinguishing practice when liquid carbon dioxide is employed, are frequently installed in such a way as to make it difficult to recognize whether the system has operated, either accidentally or as the result of a fire. It is, naturally, from the point of view of safety, very important in the case of fire extinguishing systems to be cognizant, at all times, of the state of the system.

As a rule, slow leaks or discharges are periodically checked, generally by weighing the source of the fluid medium. However, discharges of the fluid in an amount over a certain minimum, which may have been due to any cause whatsoever and which may have taken place over a period of time sufficient to impair the utility of the system, have been difficult to recognize, and it is with this type of discharges that the present indicating device is largely concerned. Such discharges may take place without the knowledge of attendants, and the indication, therefore, must be permanent to the extent that only those authorized may restore the indicating apparatus to its non-operated condition.

An object of the present invention is to provide a pressure fluid medium distributing system which has indicating means adapted to readily make known the presence of fluid pressure in the system.

Another object of the invention is to provide a system of the type referred to which will indicate the presence therein of fluid pressure only above a predetermined minimum.

A further object is to provide a system in accordance with the above objects which will indicate a presence of fluid pressure only after a certain minimum period of time.

A still further object is to provide a system which will permit recognition of the fact that fluid pressure of a given minimum amount and over a predetermined period has been effective after the disappearance of such pressure and until restored to its normal condition by a competent operator.

These and further objects will become apparent as the invention is described in detail in connection with the accompanying drawing, wherein.

Figure 1 is a diagrammatic view illustrating a high pressure fluid medium distributing system as employed in fire extinguishing practice, and organized in accordance with the present invention;

Figure 2 is a longitudinal sectional view of an indicating device in its non-operated state, illustrating an embodiment of the invention;

Figure 3 is a sectional view of the device in its operated state; and

Figure 4 is a fragmentary side elevation view of the indicating means prior to moving into their final indicating position.

Referring now to Figure 1 of the drawing, a container 1 of a fluid medium under pressure is shown controlled by a valve 2 having releasing means 3. A distributing conduit 4 connects with the outlet end of valve 2, while a discharge indicator 5 is secured into the conduit 4. The conduit continues at 4a to the point where the fluid is to be applied.

Referring to Figure 2, the indicator 5 in this particular embodiment has a main cylindrical body or cylinder 6, hollowed interiorly, and threaded at its lower end 7, and apertured at its upper end 8. A lateral projection is provided near said upper end at 9. A piston assembly 10 is fitted slidably into the body 6, and in its non-actuated state rests on a split ring 11 which is sprung into a corresponding annular groove in the inner wall of the cylindrical body 6. The body or plunger 12 of the piston assembly 10 is enlarged at its lower end to provide a piston adapted to fit into the hollow of body 6, while the upper part of the body 12 forms a projection of a somewhat smaller diameter and is split longitudinally to provide a slot 13. In the slot 13 thus formed, two leaves, or signaling arms 14 fit loosely, and are pivotally supported by a pin 15, which is borne by the split sections of the upper part of the body 12 and which traverses the slot 13. A cap-like operating button 16 is urged upwardly against the leaves 14 by a spring 17, which abuts against a plug 18 in the piston body 12, in such a way as to tend to force the leaves 14 to rotate outwardly in opposite directions about the pin 15, until they assume a horizontal position, as seen in Figure 3. However, when the piston is in its non-operated position and before the lower ends of the leaves 14 have passed the apertured end 8 of the cylinder body 6 while the piston assembly is moving upwardly, the leaves are confined in a vertical position by the cylinder walls. The indicator body 6 is threadedly secured in the conduit at its lower end 7, and is provided with a gasket 20 at the top of the piston chamber 19. When the piston assembly 10 is operated, a shoulder 21 thereof is adapted to seat on the gasket 20 to seal the upper end 8 of the cylinder or body 6 against any escape of fluid through the aperture therein.

To hold the piston assembly in its operated or signaling position, even after the pressure in the line has subsided, a spring operated detent or latch pin 22 is placed in the aforementioned projection 9 near the upper end 8 of the body 6, which yieldingly projects into the chamber 19 slightly below the lower face of the piston assembly 10, when the latter is in its fully operated position. The pin 22 is hollowed out at its outer end to receive a spring 23 which is supported at its other end by a recessed plug 24 threadedly secured into a corresponding recess 27 in the projection 9. A shoulder 25 formed circumferentially on the outer end of the pin 22 cooperates with a crimped-in rim portion of the recessed plug 24 to hold the pin 22 united with the plug. The sides 26 of the piston body 12 are sloped to permit it to pass the pin 22 in its upward travel, to push the pin 22 outwardly of the interior of the body 6 and flush with the piston chamber wall as the body moves on its way to its uppermost position. When the piston body is in its uppermost position, the pin is able to snap inwardly again to form a shoulder, upon which the piston body rests and by which it is prevented from returning to its original non-operated position. A passage 28 is provided through the pin 22 in order to allow the pressure to become equalized on both sides of the pin. The circular cap-like portion of the plug 24 is encompassed by the recess 27 formed in the projection 9, and notches 29 are cut into the circumference of cap like portion to provide for manipulation of the pin assembly, for resetting purposes of the indicator, only with a special wrench, so as to avoid undesired tampering with the indicator.

The device becomes operative as soon as sufficient pressure is present in the conduit 4 to raise the piston assembly 10, and provided such pressure is of sufficient duration for the piston to travel to the point where the signaling leaves or arms 14 are free to rotate to their horizontal indicating position. At that point the pin 22 is free to move back into its normal position, projecting into chamber 19, where it will maintain the piston body 12 and the signaling arms in their operated position. In order to reset the device, a special wrench is employed to loosen the plug 24 in its thread sufficiently for the piston assembly 10 to be free to be returned to its original non-actuated point.

From the foregoing description it will be seen that the present invention provides an improved indicating fluid pressure distributing system adapted to accomplish the objects previously pointed out. The indicating device of the system may be readily installed in new and existing systems. The indicating device is reliable in operation, is rugged in construction, and can readily withstand rough usage.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. For use with the conduit of a high pressure fluid medium dispensing system, fluid pressure indicating means connected into said conduit, comprising a cylinder having an end opening into said conduit and another apertured end, a piston member movable by pressure in said cylinder normally adjacent said conduit end, indicating lever arms pivotally carried by said piston member normally concealed within said cylinder and movable with respect thereto, means urging said lever arms into an operative position secured in said piston member, means adjacent said apertured cylinder end restraining said lever arms from assuming an operative position adapted to become inoperative after said arms have moved a given distance with respect thereto, whereby said lever urging means operate to swing said arms into an indicating position upon a pressure fluid in said conduit having moved said piston a given distance with respect to said cylinder.

2. For use with the conduit of a high pressure fluid medium dispensing system, fluid pressure indicating means connected into said conduit, comprising a cylinder having an end opening into said conduit and another apertured end, a piston member movable by pressure in said cylinder normally adjacent said conduit end, indicating lever arms pivotally carried by said piston member normally concealed within said cylinder and movable with respect thereto, means urging said lever arms into an operative position secured in said piston member, means adjacent said apertured cylinder end restraining said lever arms from assuming an operative position adapted to become inoperative after said arms have moved a given distance with respect thereto, and latching means for said piston in said cylinder adjacent its apertured end, whereby said arms may be maintained in operative position.

3. An indicator of the class described, comprising a cylinder for receiving fluid pressure, a piston movably positioned in said cylinder, indicating means carried by said piston including a pivoted member normally concealed within said cylinder, said piston being adapted to move said indicating means into a position whereby said indicating means project outwardly from said cylinder, and spring means forming a part of said indicating means and disposed for rotating said member about its pivot when said indicating means are moved into outwardly projecting position.

4. An indicator comprising a cylinder having an opening at one end for receiving fluid pressure and an aperture at the other end, an annular sealing member in said cylinder adjacent the aperture, a plunger having independently movable indicating means adapted to extend through said sealing member and the aperture and project from said cylinder, and a piston in said cylinder operatively connected to said plunger and adapted to be moved by fluid pressure towards the aperture, said piston having a surface for engaging said sealing member to form a seal for preventing pressure from leaking through the aperture when fluid pressure enters the cylinder to move said piston and said plunger.

5. In a fire extinguishing system, the combination of a source of high pressure carbon dioxide, fluid medium conducting means operatively connected to said source, a fluid pressure operable piston motor connected in said conducting means, indicating means including a plunger driven by said motor having independently movable members which are adapted to move into an indicating position at a predetermined point of the stroke of the plunger, means to stop said motor adapted to become effective just after said predetermined point has been reached, and means to maintain said indicating means in its indicating position.

6. For use in the distribution conduit of a high pressure fluid medium fire extinguishing system, a fluid pressure operable piston motor adapted for connection in the fluid pressure medium distribution conduit, indicating means including a plunger driven by said motor having independently movable members which are adapted to move into an indicating position at a predetermined point of the stroke of the plunger, means to stop said motor adapted to become effective just after said predetermined point has been reached, and means to maintain said indicating means in its indicating position.

7. An indicator of the class described, comprising a cylinder for receiving fluid pressure, a piston movably positioned in said cylinder, and indicating means carried by said piston, including a member which is pivotally supported by said means and is normally concealed within said cylinder, said piston being adapted to move said indicating means into a position whereby said indicating means project upwardly from said cylinder and said member rotates about its pivot and assumes an indicating position.

8. For use with the conduit of a high pressure fluid medium dispensing system, fluid pressure indicating means connected in the conduit, comprising a cylinder having an opening in communication with the conduit and having an apertured end, a piston in said cylinder normally adjacent the conduit end thereof and movable by pressure in said cylinder, indicating means carried by said piston including an independently movable member normally concealed within the cylinder, actuating means carried by said piston for moving the member of said indicating means into indicating position outside said apertured cylinder end, and latching means for said piston extending into said cylinder.

9. An indicator of the class described, comprising a cylinder for receiving fluid pressure, a piston movably positioned in said cylinder, and an indicating member which is pivotally supported by said piston and is normally concealed within said cylinder, said piston being adapted to move said indicating member into a position whereby said indicating member projects upwardly from said cylinder and said member rotates about its pivot and assumes an indicating position.

10. An indicator of the class described, comprising a cylinder having an opening at one end for introducing fluid pressure and having an aperture at the other end, piston means in said cylinder normally adjacent the opening thereof and movable by pressure in said cylinder, an independently movable indicating member pivotally supported by said piston means, said indicating member being concealed in said cylinder when said piston means is adjacent the opening of said cylinder and being adapted to project outwardly through the aperture of said cylinder and rotate about its pivot into an indicating position when said piston means is moved adjacent the aperture, and spring urged means carried by said piston means for assisting rotation of said indicating member into its indicating position.

ARCHIE TOWART, Jr.